(12) United States Patent
Van Wiemeersch (10) Patent No.: US 9,544,742 B2
(45) Date of Patent: Jan. 10, 2017

(54) DETERMINING VEHICLE OCCUPANT LOCATION

(71) Applicant: Ford Global Technologies, LLC, Dearborn, MI (US)

(72) Inventor: John Robert Van Wiemeersch, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/712,994

(22) Filed: May 15, 2015

(65) Prior Publication Data

US 2016/0337814 A1 Nov. 17, 2016

(51) Int. Cl.
*H04W 24/00* (2009.01)
*H04W 4/04* (2009.01)
*B60R 16/027* (2006.01)
*H04M 1/725* (2006.01)

(52) U.S. Cl.
CPC ............ *H04W 4/046* (2013.01); *B60R 16/027* (2013.01); *H04M 1/72522* (2013.01)

(58) Field of Classification Search
CPC .. H04W 64/00; H04W 8/245; H04M 1/72522; B60K 37/06
USPC ....... 455/456.1, 418, 556.1; 701/36
See application file for complete search history.

(56) References Cited

U.S. PATENT DOCUMENTS

| | | | |
|---|---|---|---|
| 6,982,656 B1 * | 1/2006 | Coppinger | G06Q 10/08 340/426.19 |
| 7,171,026 B2 | 1/2007 | Shinada | |
| 8,036,715 B2 | 10/2011 | Buck | |
| 8,738,292 B1 | 5/2014 | Faaborg et al. | |
| 8,862,486 B2 | 10/2014 | Cordova | |
| 6,526,646 B2 | 2/2015 | Bartz | |
| 9,037,125 B1 | 5/2015 | Kadous | |
| 9,037,199 B1 | 5/2015 | Stogaitis et al. | |
| 2003/0098784 A1 | 5/2003 | Van Bosch et al. | |
| 2006/0253249 A1 | 11/2006 | Bruelle-Drews | |
| 2009/0085728 A1 | 4/2009 | Catten et al. | |
| 2009/0327888 A1 * | 12/2009 | Woolf | G06Q 10/10 715/704 |
| 2010/0201505 A1 | 8/2010 | Honary | |
| 2010/0280711 A1 | 11/2010 | Chen | |
| 2011/0074565 A1 | 3/2011 | Cuddihy et al. | |
| 2011/0084807 A1 * | 4/2011 | Logan | H04Q 9/00 340/10.1 |

(Continued)

FOREIGN PATENT DOCUMENTS

| | | |
|---|---|---|
| KR | 101319939 B1 | 10/2013 |
| KR | 101335344 B1 | 12/2013 |
| WO | WO 2013188977 A2 | 12/2013 |

OTHER PUBLICATIONS

US 8,868,286, 10/2014, Mullen (withdrawn)

(Continued)

*Primary Examiner* — Danh Le (74) *Attorney, Agent, or Firm* — Frank A. MacKenzie; Bejin Bieneman PLC (57) ABSTRACT

A method includes receiving, in a vehicle computer, a message from a first user device including data concerning movement of the first user portable device. The computer associates the movement data with one of a left vehicle door opening and a right vehicle door opening.

20 Claims, 4 Drawing Sheets

(56) References Cited

U.S. PATENT DOCUMENTS

| | | | |
|---|---|---|---|
| 2011/0148575 A1* | 6/2011 | Sobecki | E05B 85/107 |
| | | | 340/5.64 |
| 2012/0053793 A1 | 3/2012 | Sala | |
| 2013/0088352 A1* | 4/2013 | Amis | G08B 15/002 |
| | | | 340/540 |
| 2013/0109342 A1 | 5/2013 | Welch | |
| 2013/0150004 A1 | 6/2013 | Rosen | |
| 2013/0158771 A1 | 6/2013 | Kaufmann | |
| 2014/0164559 A1 | 6/2014 | Demeniuk | |
| 2014/0180731 A1 | 6/2014 | Cordova | |
| 2014/0188348 A1* | 7/2014 | Gautama | B60W 10/30 |
| | | | 701/48 |
| 2014/0297220 A1 | 10/2014 | Raffa | |
| 2014/0309934 A1 | 10/2014 | Ricci | |
| 2014/0310788 A1 | 10/2014 | Ricci | |
| 2014/0333425 A1 | 11/2014 | Giraud | |
| 2014/0335902 A1 | 11/2014 | Guba | |
| 2015/0019266 A1* | 1/2015 | Stempora | G06Q 40/08 |
| | | | 705/4 |
| 2015/0025917 A1 | 1/2015 | Stempora | |
| 2015/0070131 A1 | 3/2015 | Beaurepaire et al. | |
| 2015/0130640 A1 | 5/2015 | Ryu et al. | |
| 2015/0256996 A1 | 9/2015 | Allen et al. | |

OTHER PUBLICATIONS

P. Koteswara Rao, "Scening of an accidental alarm system of vehicles with a Heart beat sensor," International Journal of Emerging Trends & Technology in Computer Science, vol. 2, Issue 2, Mar.-Apr. 2013, pp. 191-194.

Non-Final Office Action dated Apr. 7, 2016; U.S. Appl. No. 14/713,019, filed May 15, 2015; 20 pages.

Non-Final Office Action dated Apr. 12, 2016; U.S. Appl. No. 14/713,045, filed May 15, 2015; 13 pages.

Goglia et al., "Hand-transmitted vibration from the steering wheel to drivers of a small four-wheel drive tractor", Applied Ergonomics 34 (2003) 45-49; accepted Sep. 16, 2002 (5 pages).

Non-Final Office Action dated Jul. 11, 2016 in U.S. Appl. No. 14/713,025, filed May 15, 2015; (27 pages).

* cited by examiner

DETERMINING VEHICLE OCCUPANT LOCATION

CROSS-REFERENCE TO RELATED APPLICATIONS

This application is related to U.S. patent application Ser. No. 14/713,008, filed May 15, 2015 entitled "WEARABLE DATA MANAGEMENT DURING AN INCIDENT", U.S. patent application Ser. No. 14/713,019, filed May 15, 2015 entitled "DETERMINING VEHICLE OCCUPANT LOCATION", U.S. patent application Ser. No. 14/713,025, filed May 15, 2015 entitled "HAND-ON STEERING WHEEL DETECTION" and U.S. patent application Ser. No. 14/713,045, filed May 15, 2015 entitled "DETERMINING VEHICLE OCCUPANT LOCATION", the complete contents of which are hereby incorporated herein by reference in their entirety.

BACKGROUND

Present systems and methods for determining where a user is located within a vehicle suffer from various deficiencies. For example, visual systems such as facial recognition systems are expensive and typically require a dedicated camera in one or more locations. Systems determining user location based on the location of mobile phones are imprecise and unreliable because a user location and a device location can be different, e.g., a driver may place their mobile phone on the passenger seat or in a purse on the passenger floor board.

DESCRIPTION

Introduction

Tracking movement of a wearable portable device as disclosed herein provides data that can be used for determining a location of an occupant of a vehicle. A vehicle computing device may receive a message, e.g., from a remote keyless entry device, or via a phone and telematics interface, or a vehicle exterior keypad to unlock the vehicle. Based on the unlock message, the processor may initiate respective links with one or more wearable portable devices proximate to the vehicle, i.e., within a predetermined distance, and identify wearable portable devices that are associated with specific users. The vehicle computer may receive one or more messages that include movement data from the one or more wearable portable devices based on an accelerometer, g-sensor or other movement sensor in each device. Based on the movement data, the computer may identify movement patterns associated with manipulating, e.g., opening, a specific, e.g., left or right, door of a vehicle, entering the vehicle through that door, etc., and determine if a user is entering the vehicle through the specific door.

Additional data, such as a strength of a signal received from the wearable portable device when the user is in a vehicle, may be used to determine the relative distance of the wearable portable device from the receiver, and by inference, the user's relative distance from the receiver within the vehicle. For example, a signal received from a wearable portable device that has a strength above a predetermined threshold, combined with data indicating that the user entered the vehicle from the left side, or a specific door, may indicate that the user is located in a driver's seat.

Determining where a user is located in a vehicle can allow a vehicle computer to personalize the user experience, by, for example, adjusting climate control, adjusting seat position, adjusting minor positions, etc. In addition, safety systems such as seatbelt systems and airbag systems may be adjusted according to the location of users within the vehicle or certain features may be enabled or modified depending on the driving privileges of the driver.

System Elements

Figure 1:
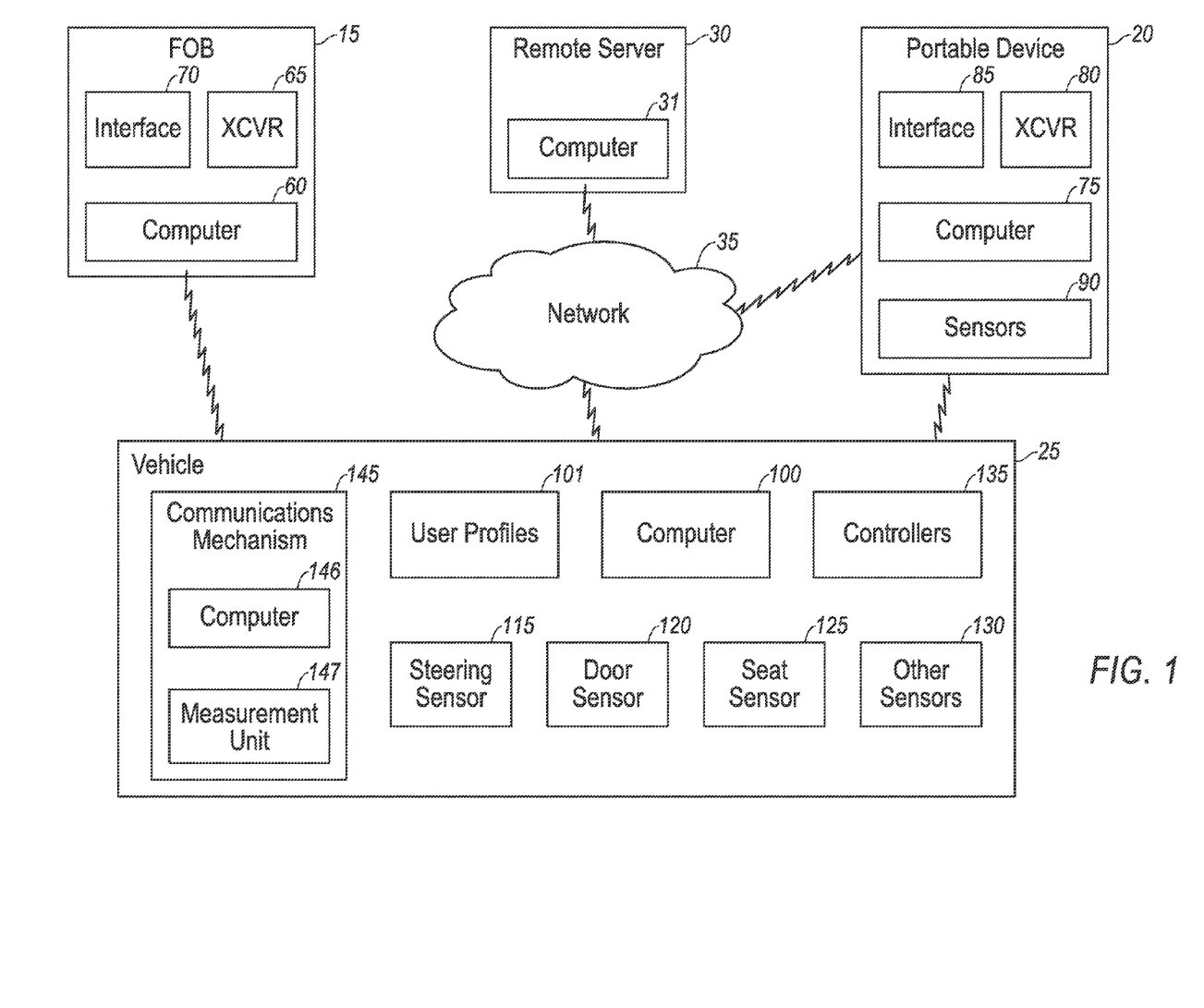
FIG. 1 is diagram of an exemplary system for determining location(s) of one or more occupants of a vehicle using a portable device.

As shown in FIG. 1, a system 10 includes a remote keyless entry device which may be a traditional fob or, e.g., a phone based remote entry telematics application (hereinafter fob) 15, one or more portable devices 20, a vehicle 25, a server 30 and a network 35. As described below, the fob 15 and portable device 20 may be communicatively coupled with the vehicle 25. Further as described below, the portable device 20 may be, e.g., a wearable device with or without cellular capability, a mobile telephone, a tablet, etc., and may be directly communicatively coupled with the vehicle 25, or indirectly coupled with the vehicle 25, e.g., through another portable device 20. The vehicle 25 may further be communicatively coupled with the server 30 via the network 35.

The fob 15 is configured, i.e., includes known mechanisms such as programming in a computer 60 and hardware such as a transceiver 65 for wireless communications, to send messages to the vehicle 25, e.g., commands or instructions controlling operations of the vehicle 25. For example, the fob 15 may send commands to the vehicle 25 instructing the vehicle 25 to lock or unlock doors, open a trunk lid or other hatch, start the ignition, etc. The fob 15 further generally includes a user interface 70. The fob 15 may be an app on the portable device 20 which sends these same commands to the remote sever 30 or network 35 which may then send commands to the vehicle 25 instructing the vehicle 25 to lock or unlock doors, open a trunk lid or other hatch, start the ignition, etc.

One or more fobs 15 may be paired with a vehicle 25. For example, as is known, a fob 15 may be programmed with a specific identification code and the vehicle 25 may include a list of identification codes authorized to send commands to the vehicle 25. The vehicle 25 may look for one or more identification codes upon receiving messages, and determine if the fob 15 is authorized.

The fob 15 computer 60 includes a processor and a memory. The processor is programmed to execute programs stored in the memory, e.g., to send commands to the vehicle 25. The transceiver 65 is configured to transmit radio frequency (RF) signals to, and optionally receive RF signals from the vehicle 25. As is known, typical fob 15 frequencies of operation for one-way communication are 315 MHz or 433 MH and for two-way communications are 902 MHz or 868 MHz. For Passive Entry and Passive Start systems, the vehicle 25 may send commands to Fob 15 using Low Frequency (LF) transmissions at frequencies of 125 kHz or 135 kHz.

The fob 15 user interface 70 includes one or more input mechanisms and may include a display. The input mechanisms may be buttons, a touch screen display, a gesture sensing device, etc., for receiving input from a user. The display may include an LCD display, LED display, buzzers speakers, haptic feedback, etc., for providing information to the user.

Additionally or alternatively, other systems may also be used to command the vehicle 25 to unlock, start, etc. For example, the vehicle 25 may be equipped with a passive entry system, e.g., that sends a message to fobs 15 proximate to the vehicle 25 and looks for a response from a paired fob 15. Other possible systems to unlock/start/etc. the vehicle 25 include a keypad, remote entry mechanical key, telematics unlock system, etc.

A portable device 20 may be, e.g., a wearable portable device 20 or a mobile portable device 20. A wearable portable device 20 may include a connectivity product such as a "smart" watch, a fitness band, smart clothing, jewelry, etc. A mobile portable device 20 may include, e.g., a mobile telephone, tablet, laptop, etc. Some wearable portable devices 20 may include built-in modems or full cellular capability. Other wearable portable devices 20 may need to link or pair, e.g., with a mobile portable device 20 such as a mobile telephone, tablet, laptop, etc. in order to establish communications with the vehicle 25. Each portable device 20 typically includes a computer 75, a transceiver 80, and an interface 85. The portable device 20 may further include one or more sensors 90, discussed further below.

Each portable device 20 may be associated with a user. For example, the portable device 20 may include a user profile 101, and send the user profile 101 to the vehicle 25 when the portable device 20 initiates communication with the vehicle 25. Alternatively, the portable device 20 may have been paired with the vehicle 25, for example, via a synchronization system in the vehicle 25. In this case, the vehicle 25 may maintain a user profile 101 associated with the paired (synchronized) portable device 20.

The user profile 101 may be a set of data associated with the user. The user profile 101 may include data such as user preferred vehicle settings (e.g., seat settings, minor settings, temperature settings, radio station), user characteristics (e.g., height, weight, age, medical conditions), routines (typically drives to work on weekday mornings), etc. The user profile 101 may be maintained by a computer 100 on the vehicle 25. Additionally or alternatively, one or more portable devices 20 may maintain a user profile 101 identified with the user. The user profiles 101 maintained on the portable devices 20 may be accessed by the vehicle 25 and combined with the data in the vehicle 25 user profile 101. The data in the user profile 101 may be entered by the user via an interface on the vehicle 25 or one of the portable devices 20 associated with the user, determined by the computer 100 in the vehicle 25, downloaded from other computing devices, e.g., the server 30, etc.

The portable device 20 may be configured for short range, wireless communication with the vehicle 25. For example, the portable device 20 transceiver 80 may be a BLUETOOTH® transceiver capable of forming links with other BLUETOOTH transceivers. One or more portable devices 20 and the vehicle 25 may accordingly exchange messages. A portable device 20 may transmit a signal including, e.g., identification data (identifying the type of user device, the identity of a user, etc.), movement data, etc. to the vehicle 25. In addition or alternatively to BLUETOOTH, other suitable wireless communication protocols, e.g., NFC, IEEE 802.11 or other protocols as may be known, may be used for communication between the portable devices 20 and the vehicle 25.

Further, a portable device 20 may be configured to link with other portable devices 20. For example, a first portable device 20 may be a smart watch, and a second portable device 20 may be a mobile telephone. The first portable device 20 may link with the second portable device 20 and exchange data with the second portable device 20; the first and second portable devices 20 may be associated with a same user. As one example, the first portable device 20 may include biometric sensors 90 to measure the heart rate of the user and transmit the heart rate to the second portable device 20. The second portable device 20 may output the heart rate data to the user via the second portable device 20 interface 85. BLUETOOTH communication links typically operate at frequencies from 2402-2480 MHz. As above, other suitable wireless communication protocols such as are known may alternatively or additionally be used to form the communication links with other portable devices 20.

In addition to biometric sensors 90, portable device 20 sensors 90 may include accelerometers, g-sensors, gyroscopes, compasses, light sensors, cameras, etc. The sensors 90 may measure movements of the portable device 20 and output movement data that the portable device 20 may then communicate to the vehicle 25. As described below, the vehicle 25 may determine, based on the movement data, e.g., that the user of the portable device 20 has opened a door of the vehicle 25.

Figure 2:
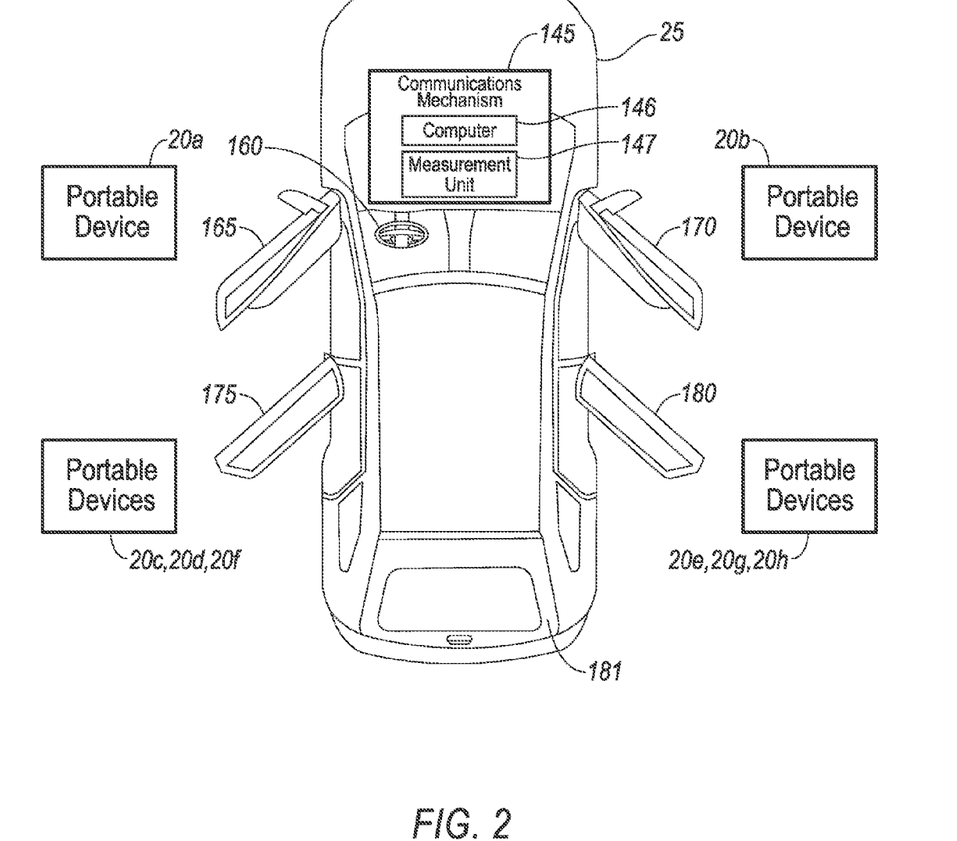
FIG. 2 is a top view of an exemplary vehicle including a communications mechanism for communicating with portable devices.

The vehicle 25 is generally a land-based vehicle having three or more wheels, e.g., a passenger car, light truck, etc. The vehicle 25 accordingly generally has a front, a rear, a left side and a right side, wherein the terms front, rear, left and right are understood from the perspective of a user of the vehicle 25 seated in a driver's seat in a standard operating position, i.e., facing a steering wheel 160 (FIG. 2). The vehicle 25 includes the computer 100 including a processor and a memory. The memory includes one or more forms of computer-readable media, and storing instructions executable by the processor for performing various operations, including as disclosed herein. Further, the computer 100 may include and/or be communicatively coupled to more than one other computer, e.g., steering sensors 115, door sensors 120, seat sensors 125, other sensors 130 and controllers 135. The vehicle 125 computer 100 is further typically communicatively coupled with a communications mechanism 145 configured for wireless communications with on-board and external wireless devices including the fob 15, portable device 20, remote server 30 and network 35.

The computer 100 is generally programmed and arranged for communications on a controller area network (CAN) bus or the like. The computing device 100 may also have a connection to an onboard diagnostics connector (OBD-II), e.g., according to the J1962 standard. Via the CAN bus, OBD-II connector port, and/or other wired or wireless mechanisms, the computer 100 may transmit messages to various devices in a vehicle and/or receive messages from the various devices, e.g., controllers, actuators, sensors, etc. In addition, the computer 100 may be configured for communicating, e.g., with one or more remote servers 30, with one or more fobs 15, with one or more portable devices 20 and/or with the network 35.

The steering sensors 115 may be steering angle sensors, steering torque sensors, motor sensors associated with power steering assist, etc., known to provide data related directly or indirectly to steering operations. For example, a steering sensor 115 may be a steering angle sensor which senses a rotation of a vehicle 25 steering wheel 160, and communicates the steering wheel 160 rotation data to the computing device 100. As another example, a steering sensor 115 may sense rotation of a motor providing power assist for steering operations, and provide the motor rotation data to the computer 100.

Door sensors 120 may be mechanical switches that are activated by the door, proximity sensors, hall-effect sensors, or the like, such as are known, that indicate if a door is open or closed and that provide door status data to the computing device 100. For example, there may be one door sensor 120 associated with each door of the vehicle 25.

Seat sensors 125 may include a variety of sensors including occupancy sensors and seat position sensors such as are known. The seat sensors 125 may, e.g., determine whether a user is occupying a seat, determine the weight of the user, and communicate the determined weight to the computer 100. Further, the seat sensors 125 may detect either directly or indirectly the position of a seat, angle of a seat back, height of a headrest, etc., and provide data to the computer 100 with regard to one or more of these settings. Yet further, the computer 100, may, e.g., upon identifying a seat user, adjust settings to a user profile associated with the user.

The vehicle 25 may include one or more other sensors 130. The other sensors 130, may include, as non-limiting example only, cameras, optical sensors, radar, microphones, proximity sensors, ultrasonic sensors, pressure sensors, accelerometers, gyroscopes, temperatures sensors, current sensors, voltage sensors, infrared sensors, capacitive sensors, etc. The sensors may include processors and memories, and may be configured to communicate with and send data to the computer 100, e.g., via a CAN bus or the like.

The vehicle 25 may also include one or more controllers 135 for controlling vehicle 25 components. The one or more controllers 135 may include known controllers, as non-limiting examples, a seat controller, a power steering controller, a door lock controller, a door latch controller, a climate controller, a mirror adjustment controller, a seatbelt controller, a climate controller, a brake controller, etc. Each of the controllers 135 may include respective processors and memories, one or more actuators, and one or more sensors, as is known. The controllers 135 may be configured to receive instructions from the computing device 100 and control an actuator based on such instructions. For example, a door lock controller 135 may receive an instruction to unlock a door and may cause an actuator to unlock a lock associated with the door. Further, the controller 135 may include sensors. The sensors, may, e.g., detect the action of the actuator. For example, the door lock controller 135 may detect the lock being in an unlocked condition. The controller 135 may provide data regarding the status of the lock to the computer 100.

As stated above, a vehicle 25 may further include a communications mechanism 145 for wireless communications with vehicle on-board and external devices configured for wireless communications. For example, the communications mechanism 145 may include a computer 146 having a processor and a memory, and a measurement unit 147. The communications may be direct communications, i.e., between a transceiver in the communications mechanism 145 and a transceiver in the wireless device, or indirect communications, e.g., via a network such as a network 35.

The communications block 145 may generally be configured to support communications with 1-Way (typically 315 MHz or 433 MHz), or 2-Way (typically 902 MHz or 868 MHz) remote keyless entry (RKE) systems, passive-entry passive-start (PEPS) systems (125 kHz LF challenge and 315 MHz or 433 MHz response), near field communications (NFC) (typically 13.56 MHz), Bluetooth systems (2402-2408 MHz), vehicle-to-vehicle (V2V) systems and vehicle-to-infrastructure (V2I) systems in the Dedicated Short Range Communications (DSRC) Band (5.9 GHz), mobile devices in the cellular bands, Wi-Fi (typically 2.4 GHz or 5 GHz bands), GPS systems (1575.42 MHz and 1227.6 MHz), etc. Examples of protocols that the communication block 145 may support include Bluetooth, NFC, DSRC, 3G UMTS protocols as defined by the 3GPP standards body, 4G LTE protocols as defined by the 3GPP standards body, Wi-Fi 802.11 protocols as defined by IEEE, W-Max 802.16 protocols as defined by IEEE, or other suitable wireless communication protocols.

As described in more detail below, the communications mechanism 145 may be configured to communicate with the fob 15, the portable device 20 and, via the network 35, with a remote server 30.

The communications mechanism 145 may be configured to establish communications with one or more portable devices 20. Upon receiving an instruction to unlock the vehicle 25 as described above, the computer 100 may instruct the communications mechanism 145 to search for and establish communications with portable devices 20 proximate to, e.g., within 3 meters of, the vehicle 25. The communications mechanism 145 may search for all portable devices 20 proximate to the vehicle, or, e.g., a specific list of portable devices 20 associated with known users of the vehicle 25. The portable devices 20 may then respond to the communications mechanism 145. In another scenario, the communications mechanism 145 may, e.g., periodically search for, and establish communications with, portable devices 20 proximate the vehicle 25. Upon establishing communications with the devices 20, the communications block 145 may send instructions requesting user identification data, movement data, etc. from the portable devices 20. In certain scenarios, the computer 100 may specifically establish communications directly or indirectly with wearable portable devices 20.

In addition to communicating with the one or more portable devices 20, the communications mechanism 145 may determine a strength of signals received from respective portable devices 20. As shown in FIG. 1, the communications mechanism 145 may include a measurement unit 147. The measurement unit 147 may receive signals from the portable devices 20, and measure signal strength in a known manner. When applicable, e.g., when seeking to determine a location of a user, the measurement unit 147 should measure the signal strength of the signal transmitted from the wearable portable device 20 and not the signal transmitted from the supporting mobile portable device 20. The measurement unit 147 may provide this information to the computer 100. As described below, the strength of a signal received from a portable device 20 may be an indication of the distance (also referred to herein as range) of the portable device 20 from the communications mechanism 145. This information may be used, particularly in the case of a wearable portable device 20, to determine a boundary or zone where a user of the wearable portable device 20, is located within the vehicle 25. The measurement unit 147 may determine these zones with one transceiver antenna. Alternatively, two or more antennas may be used if, e.g., they exist for other features.

The vehicle 25 communications mechanism 145 may further be configured to communicate, e.g., over a network 35 with a remote server 30. For example, when the vehicle 25 has been involved in an accident, the vehicle 25 may be able to transmit a message to the remote server 30 indicating that the vehicle 25 was involved in an accident, and may be able to send additional information such as the location of the vehicle 25. When the vehicle 25 is linked to one or more portable devices 20, the vehicle 25, via the communications mechanism 145 may additionally or alternatively be able to send user status information, such as the user's vital signs, to the remote server 30.

The network 35 represents one or more mechanisms by which the vehicle 25 may communicate with remote computing devices, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks, local area networks (LAN) and/or wide area networks (WAN), including the Internet, providing data communication services.

Processes

Identifying a Vehicle Unlock or other Trigger Event for a User Location Identification Process The vehicle 25 computer 100 may receive a signal from the fob 15 to unlock the vehicle 25, or recognize another trigger event for starting a user location identification process. For example, a user of the vehicle 25 may activate the fob 15, and the fob 15 may send an unlock command to the vehicle 25. The vehicle 25 computer 100 may receive the unlock signal, and initiate a process to identify locations of one or more users in the vehicle 25.

As another example, a sensor 130 may detect a user grabbing or touching a door handle to pull on the door handle with the intent to open the door, and based on the detection, the computer 100 may initiate and establish communications with fobs 15 proximate the vehicle 25 to authorize unlocking a door. The computer 100 may determine that one or more of the fobs 15 is an authorized fob 15 for the vehicle 25, e.g., in a manner as described above. Conversely, if the door was already unlocked the trigger of sensor 130 may still be used to inform computer 100 that a user is about to open a door. The computer 100 may also receive an input from a key pad on the vehicle 25, a door or global unlock event activated by a mechanical key, an ignition activated by a mechanical key, from a telematics system, etc. that is identified as a trigger event for initiating a user location identification process. Still further, the computer 100 could initiate the user location identification process periodically, based on a timer, etc.

Identifying Door Opening Events from Wearable Device Movements

Upon recognizing a trigger event, the computer 100 may initiate a process to instruct the portable device 20, which may be a wearable portable device 20, to record g-sensor data for a specified period to hand motions and then monitor all vehicle 25 door ajar sensors to determine where users entered the vehicle 25. The computer 100 may monitor g-sensor movements of the portable devices 20 associated with vehicle 25 users, and based on the movement data identify a device 20, and hence a user, that may be associated with opening a particular vehicle 25 door. In the case of only one door opening and only one portable device 20 being identified with a signature movement data pattern, it may be possible to conclude who has entered that door. In cases where more doors have opened than there are detected portable devices 20, additional data is required to predict the user's location. The computer 100 may further use the movement data as an indication of where the user is located in the vehicle 25 after entering the vehicle 25.

Now referring to FIG. 2, the vehicle 25 may include a steering wheel 160, front left door 165, front right door 170, rear left door 175, rear right door 180, and rear door 181. The vehicle 25 may further include the communications mechanism 145. The communications mechanism 145 may be located in a front center portion of the vehicle 25. Alternatively, for example, a portion of the communication mechanism 145 used to establish communication with the portable devices 20 may be located in the center front portion of the vehicle 25, and other portions of the communications mechanism 145 may be located in one or more other locations in the vehicle 25. The portion of the communications mechanism 145 used to establish communications with the portable devices 20 should be strategically placed such that the strength of a signal received from a respective portable device 20 is indicative of a definable zone within the vehicle 25.

As described above, the communications mechanism 145 may include a measurement unit 147, and may be configured to establish communications with portable devices 20. The measurement unit 147 may be configured to measure the strength of signals received from the portable devices 20, and to report the strength of the signals from the respective portable devices 20 to the computer 100 of the vehicle 25.

Upon identifying a trigger event for initiating a user location identification process as described above, the computer 100, based on the trigger event may activate the communications mechanism 145, and instruct the communications mechanism 145 to search for and establish communications with portable devices 20 proximate the vehicle 25. The computer 100 may limit the search to previously paired portable devices 20. As above, when applicable, e.g., when seeking to identify a range of a user from the communications mechanism 145, the measurement unit 147 should measure the signal strength of the signal transmitted from the wearable portable device 20 and not the signal transmitted from the supporting mobile portable device 20.

As shown in FIG. 2, in one example, the computer 100 may find and establish communications (via the communications mechanism 145) with portable devices 20a-20h which are determined to be wearable portable devices 20. The computer 100 may command each of the wearable portable devices 20a-20h to send movement data associated with the respective wearable portable devices 20a-20h to the computer 100.

By monitoring and evaluating the movement data received from the wearable portable devices 20a-20h, the computer 100 may determine, e.g., that the user of wearable portable device 20a has opened a left side door 165, 175. Particular wrist movements, e.g., one or more of twisting counter-clockwise to grab a door handle, swinging up and to the left to open a door handle, swinging to the left on an arc similar to the arc of a door handle on a left handed door being opened, may be indicative of opening a left side door 165, 175 of the vehicle 25.

In a similar manner, the computing device 100 may determine, e.g., that a user of wearable portable device 20d also opened a left side door 165, 175, and further, in a similar manner, by identifying gestures associated with a right side door, that e.g., the user of wearable portable device 20e has opened a right side door 170, 180.

In addition to identifying movements of a wearable portable device 20 worn by a user on an arm used for opening a door, other types of movements may be identified as movements indicating a door opening. For example, for a user opening a right door 170, 180 with their right arm, and wearing a wearable portable device 20 on their left arm, particular movements, for example the swinging of the left arm around the body during door opening (or entering the vehicle 25) may be indicative of a right door 170, 180 opening event. Other movements of wearable devices 20 may be determined to be characteristic of opening a vehicle 25 door, 165, 170, 175, 180,181. Further, movements that are characteristic of closing a vehicle 25 door 165, 170, 175, 180 may indicate a user having entered a left door or a right door.

As described above, a determination that a user has opened a particular vehicle 25 door 165, 170, 175, 180, 181 may be performed by the computer 100. Additionally or alternatively, the determination may be made, e.g., by the computer 75 in the respective wearable portable device 20, and the results communicated to the computer 100. Additionally or alternatively, the determination may be made by another computer communicatively coupled to the computer 100.

Identifying Location Zones for Wearable Portable Devices based on Received Signal Strength Additional information regarding the location of users within a vehicle 25 may be determined based on the received signal strength of signals received by the communications mechanism 145 from portable devices 20. When applicable, e.g., when seeking to determine a range of a user from the communications mechanism 145, the portable devices 20 may be wearable portable devices 20.

Figure 3:
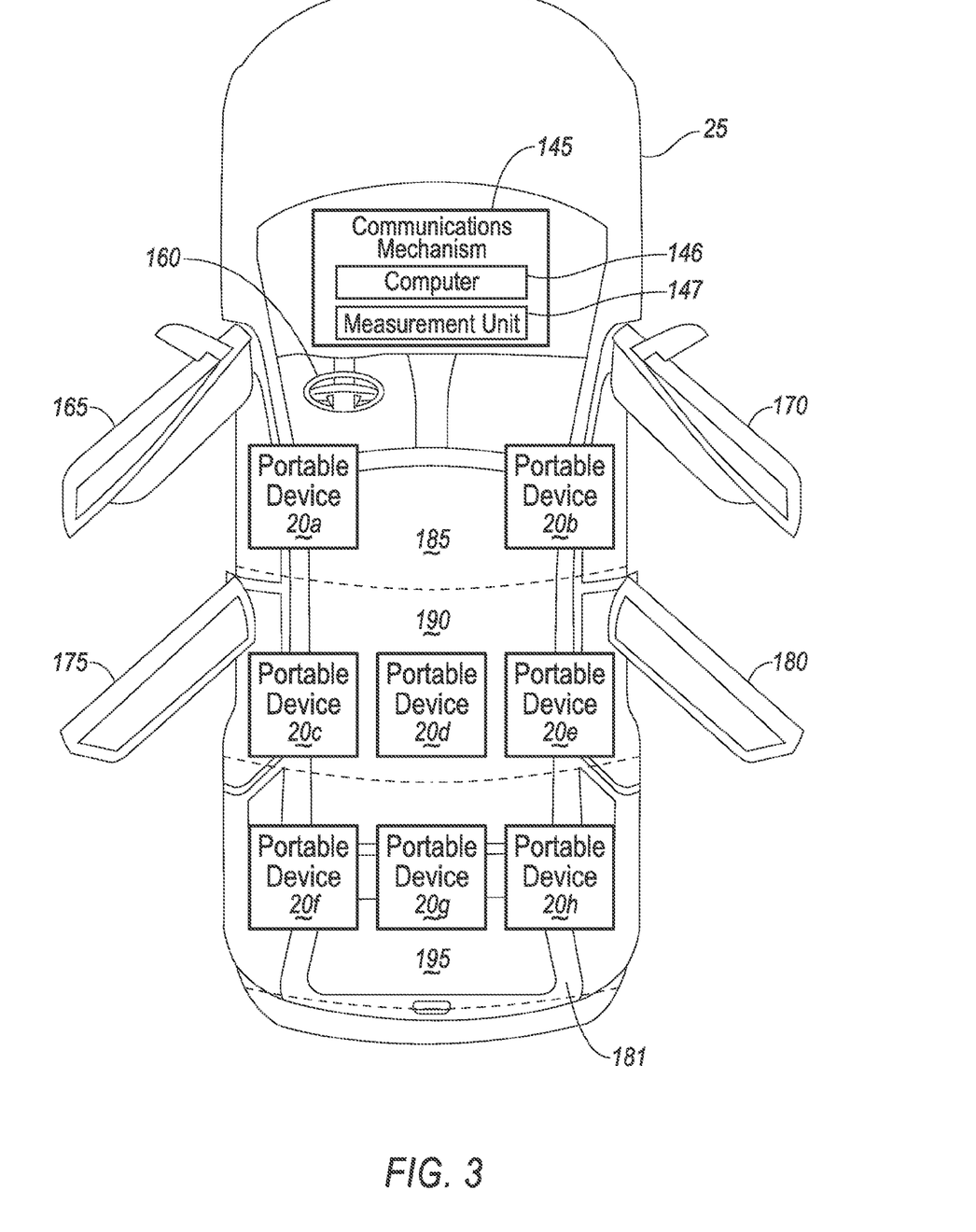
FIG. 3 is a further top view of the exemplary vehicle of FIG. 2, including the communications mechanism, illustrating location zones.

As shown in FIG. 3, the vehicle 25 may be divided into three or more zones based on distance from the communications mechanism 145; a first zone 185, a second zone 190 and a third zone 195. The portable devices 20a and 20b may be located in the first zone 185. The portable devices 20c, 20d, 20e may be located in the second zone 190, and the portable devices 20f, 20g, 20h may be located in the third zone 195. As above, the computing device 100 may establish communications via the communications mechanism 145 with each of the portable devices 20a-20h.

The communications mechanism 145 may be configured to measure received signal strength of the signals received from each of the portable devices 20a-20h, and provide a received signal strength indication (RSSI) such as is known to the computer 100 respectively for each of the portable devices 20a-20h.

Based on the respective received signal strengths, the computer 100 may determine the zone in which each of the portable devices 20a-20h is located. For example, if the RSSI is greater than or equal to a first predetermined threshold and less than a second predetermined threshold, the computing device may determine that the associated portable device 20 is located within the third zone 195. If the RSSI is greater than or equal to the second predetermined threshold and less than a third predetermined threshold, the computer 100 may determine that associated portable device 20 is located in the second zone 190. If the RSSI is greater than or equal to the third predetermined threshold, the computer 100 may determine that the associated portable device 20 is located in the first zone 185. The first, second and third predetermined thresholds may be determined empirically based on representative portable devices 20, the location of the communications mechanism 145, the type of vehicle 25, etc. In the example according to FIG. 3, the computer 100 would determine that portable device 20a-20b are in the first zone 185, devices 20c-20e are in the second zone 190 and devices 20f-20h are in the third zone 195.

Identifying the Driver and Front Seat Passenger based on Door Opening and Zone Data Based on the door opening data and zone data collected above, the computer 100 can be programmed to determine the driver and front passenger of the vehicle 25.

For example, if, as described above, the computer 100 determines based on the RSSI of the portable device 20a that the portable device 20 is in the first zone 185, and determines based on the movement data from the portable device 20a that the user of portable device 20a entered a left side door of the vehicle 25, the computer 100 may further determine that the user of the portable device 20a is located in a front left (driver's) seat of the vehicle 25.

Further, if, in the example above, the computer 100 determines based on the RSSI of portable device 20b that the portable device 20b is also in the first zone 185, the computer 100 may determine that the user of the portable device 20b is in a front passenger seat. The same process for locating the driver and front row passenger can also be applied to right hand drive vehicles by reversing the relationships of detected door opening events.

Process for Determining User Location

Figure 4:
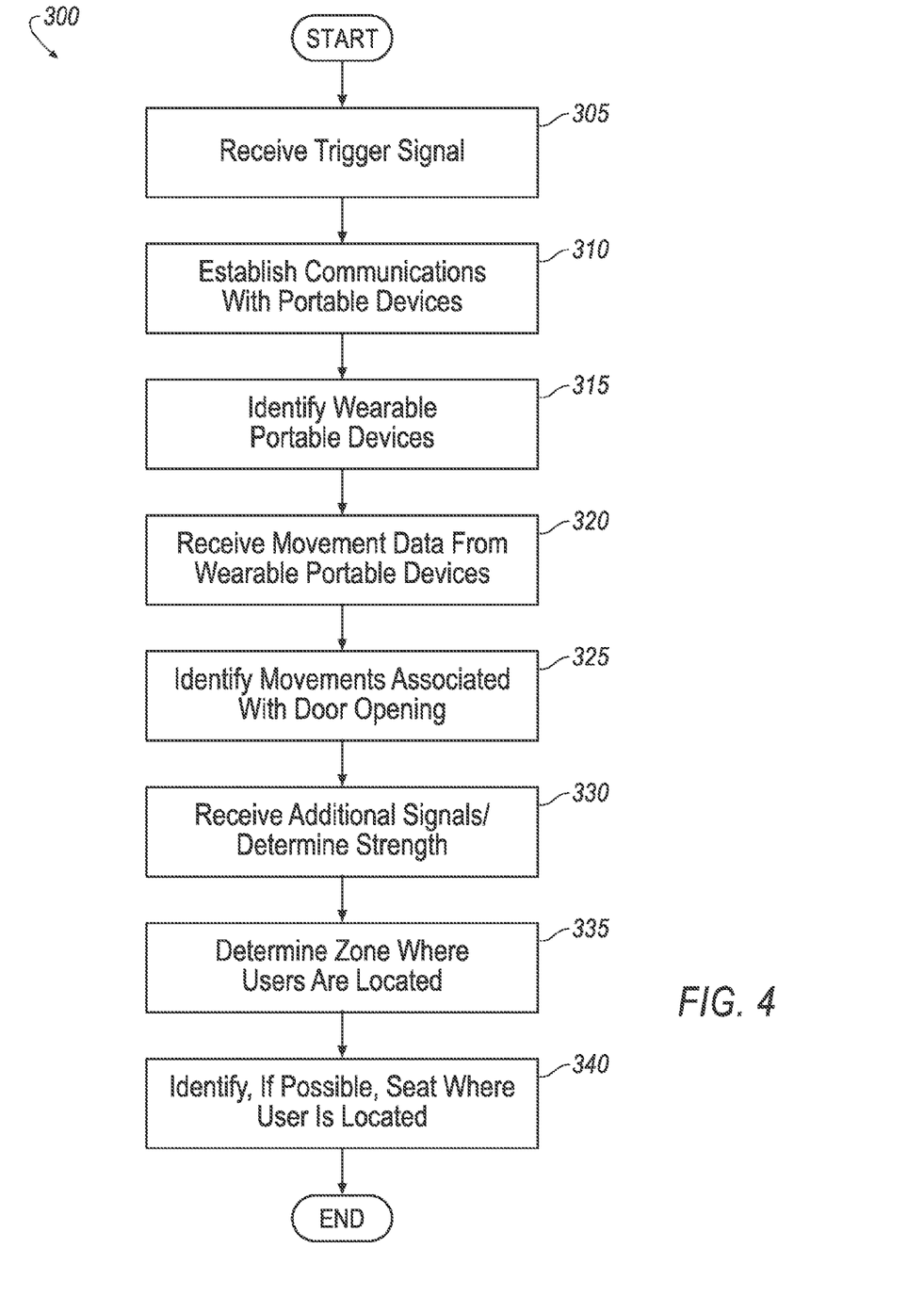
FIG. 4 is a diagram of an exemplary process for determining location(s) of one or more occupants in a vehicle.

FIG. 4 is a diagram of an exemplary process 300 for determining location(s) of one or more users within the vehicle 25 based on data from portable devices 20 associated with vehicle 25 users. The process 300 starts in a block 305.

In the block 305, the vehicle 25 computer 100 recognizes that a trigger event for initiating a user location determination process has occurred, as described above. The process 300 continues in a block 310.

In the block 310, the computer 100, via the communications mechanism 145, establishes communications with one or more portable devices 20 proximate the vehicle 25. As described above, the communications mechanism 145 may limit communications to portable devices 20 previously paired with the vehicle 25, or additionally include unpaired portable devices 20 proximate the vehicle 25. The computer 100 may further associate previously paired portable devices 20 with respective user profiles stored in the vehicle 25. The process 300 continues in a block 315.

In the block 315, the computer 100 determines which of the portable devices 20 identified in the block 310 are wearable portable devices 20. The computer 100 then sends requests, directly or indirectly, to each of the wearable portable devices 20 to measure movements of the wearable portable devices 20 and to send movement data representing the movements of the respective wearable portable device 20 to the computer 100. Each of the wearable portable devices 20, using sensors 90 as described above, measures movement data, and sends the movement data to the computer 100. In some cases, the wearable portable devices 20 may process the movement data. The wearable portable devices 20 may send additional data, such as identification data. The process 300 continues in a block 320.

In the block 320, the computer 100, via the communications mechanism 145, receives the movement data, identification data, etc. from the wearable portable devices 20. The process 300 continues in a block 325.

In the block 325, the computer 100 identifies movements associated with opening doors 165, 170, 175, 180, 181 of the vehicle 25 as described above. In the case that sufficient data is available, the computer 100 identifies where a user has entered the vehicle 25. For example, the computer 100 may determine that a user has entered a left side door 165, 175 of the vehicle 25. Other computers, e.g., the computer 75 in each wearable portable device 20, or a computer communicatively coupled with the computer 100 may also make the determination. The process 300 continues in a block 330.

In the block 330, the computer 100 receives additional communications from the wearable portable devices 20 via the communications mechanism 145. As described above, a measuring unit 147 measures the received signal strength of the signals received from the wearable portable devices 20. Based on the measurements, the communications block sends a received signal strength indication (RSSI) associated with the signals received respectively from the mobile devices to the computer 100. The process 300 continues in a block 335.

In the block 335, the computer 100 determines the zone where a user is located based on the RSSI from the respective wearable portable devices 20. As described above, the computer 100 may compare the RSSI from each mobile device with first, second and third predetermined thresholds, and determine that each wearable portable device 20 is located in one of a third, second and first zone. The process 300 continues in a block 340.

In the block 340, the computer 100, if possible, determines, based on the movement data received in the block 320 and the signal strength data received in the block 330, where a user is located within a zone. For example, as described above, the computer 100 may determine that a first user of a first wearable portable device 20 is located in the driver's seat based on movement data that indicates that first user entered a left door 165, 175 of the vehicle 25, and further based on signal strength data indicating that the first wearable portable device 20 is located in the first zone. The computer 100 may further determine that a second user of a second wearable portable device 20 is located in the front passenger seat based on signal strength data indicating that the second wearable portable device 20 is in the first zone, and the previous determination that the first user is in the driver's seat. Upon providing the best available determination of the users' location, the process 300 ends.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising a memory device and a processor storing instructions executable by the processor such that the computer is programmed to:
    receive a message from a first user device including data concerning movement of the first user device;
    associate the movement data with one of a left vehicle door opening and a right vehicle door opening;
    receive a second signal from the first user device;
    evaluate a strength of the second signal;
    determine a location of a first user associated with the first user portable device based at least in part on the strength of the second signal; and
    determine that the first user is located in a front row of the vehicle if the strength is greater than or equal to a first predetermined threshold.

2. The computer of claim 1, further programmed to:
    identify a trigger for starting a user location determination process; and
    initiate, upon identifying the trigger for starting the user location determination process, a first communication to the first user portable device.

3. The computer of claim 2, further programmed to:
    include, in the identification of a trigger, at least one of receiving a command from a fob, detecting a user touching a door handle, receiving an input from a key pad, detecting an unlock event activated by a mechanical key and receiving an input from a timer.

4. The computer of claim 1 wherein the first user device is a wearable portable device.

5. The computer of claim 1, further programmed to:
determine that the first user is located in a front left seat if the movement data is associated with a left door opening and the strength of the second signal is greater than or equal to a first predetermined threshold.

6. The computer of claim 5, further programmed to:
receive a third signal from a second user portable device associated with a second user;
evaluate a strength of the third signal; and
determine that the second user is located in a front right seat if the strength of the third signal is greater than or equal to the first predetermined threshold.

7. The computer of claim 6, wherein the second user device is a wearable portable device.

8. The computer of claim 1, further programmed to:
send instructions to at least one vehicle controller to adjust at least one vehicle component based at least in part on the determined location.

9. The computer of claim 1, wherein the movement data is based at least partially on an output signal from a sensor in the first user portable device.

10. A computer, comprising a memory device and a processor storing instructions executable by the processor such that the computer is programmed to:
receive a first signal from a first user device located outside a vehicle, the first signal including movement data from sensors included in the first user device;
identify, from the movement data, a movement characteristic of opening a vehicle door; and
determine, based at least in part on the identified movement, that the user opened one of a left vehicle door and a right vehicle door.

11. The computer of claim 10, further programmed to:
identify a trigger for starting a user location determination process; and
initiate, upon identifying the trigger for starting the user location determination process, a first communication to the first user portable device.

12. The computer of claim 11, further programmed to:
include, in the identification of a trigger, at least one of receiving a command from a fob, detecting a user touching a door handle, receiving an input from a key pad, detecting an unlock event activated by a mechanical key and receiving an input from a timer.

13. The computer of claim 10 wherein the first user device is a wearable portable device.

14. The computer of claim 10, further programmed to:
receive a second signal from the first user device;
evaluate a strength of the second signal; and
determine a location of a first user associated with the first user portable device based at least in part on the strength of the second signal.

15. The computer of claim 14, further programmed to:
determine that the first user is located in a front row of the vehicle if the strength is greater than or equal to a first predetermined threshold.

16. The computer of claim 14, further programmed to:
determine that the first user is located in a front left seat based on a determination that the user opened the left vehicle door and the strength of the second signal is greater than or equal to a first predetermined threshold.

17. The computer of claim 16, further programmed to:
receive a third signal from a second user portable device associated with a second user;
evaluate a strength of the third signal; and
determine that the second user is located in a front right seat if the strength of the third signal is greater than or equal to the first predetermined threshold.

18. The computer of claim 17, wherein the second user device is a wearable device.

19. The computer of claim 10, further programmed to:
send instructions to at least one vehicle controller to adjust at least one vehicle component based at least in part on the determined location.

20. The computer of claim 10, wherein the movement data is based at least partially on an output signal from a sensor in the first user portable device.

\* \* \* \* \*